__United States Patent Office__ 3,684,738
Patented Aug. 15, 1972

3,684,738
REACTIVATION OF DEACTIVATED
ZEOLITE CATALYSTS
Nai Y. Chen, Titusville, N.J., assignor to
Mobil Oil Corporation
No Drawing. Filed Mar. 16, 1970, Ser. No. 20,033
Int. Cl. B01j 11/02, 11/30
U.S. Cl. 252—412                                    2 Claims

ABSTRACT OF THE DISCLOSURE

Crystalline aluminosilicate catalysts characterized by a silica to alumina mole ratio of greater than about 6 and a pore size ranging from about 5 to about 13 angstrom units lose their activity after considerable use in hydrocarbon conversion reactions and are regenerated by contact, under particularly defined conditions, with a source of hydrogen ions or hydrogen ion precursors.

BACKGROUND OF THE INVENTION

(1) Field of the invention

This invention relates to the reactivation of crystalline aluminosilicate catalysts that undergo a slow and heretofore irreversible loss of activity during their use in hydrocarbon conversion reactions. More specifically, this invention relates to a method by which these catalysts are regenerated by contact with a specified source of hydrogen ions or hydrogen ion precursors.

(2) Description of the prior art

The use of crystalline aluminosilicates to catalyze a wide variety of hydrocarbon conversion processes is well known. However, it has been found that heretofore, catalysts employed for cracking, reforming, hydrocracking, isomerization, disproportionation and the like exhibited a slow but irreversible loss in their activity under conditions of high temperature and/or high pressure. Various methods have been used to restore the activity for each such type catalyst.

For example, hydrocracking catalysts which contain a hydrogenation metal component have been contacted with strong mineral acids to form salts with the aforesaid metal component. These salts are then decomposed below 1000° F. and the metal compound is redistributed in a finer and more active form. This method is effective in dealing with the problem of crystallite growth of the hydrogenation metal component. However, this method is limited by specified time, temperature and concentration restrictions. In addition, the acid must necessarily be added before removal of the coke by combustion.

Catalysts which are used in the isomerization or disproportionation of alkyl aromatic hydrocarbons are kept relatively free of polymeric material, which would lower the catalyst activity, by using a liquid phase as a solvent, carrier, or reaction assistant. This liquid phase is preferentially absorbed and prevents the adsorption and polymerization of reactants. However, this process does not prevent the slow deactivation postulated to be due to a reaction between the zeolite catalyst and chemical water contained therein.

As is well known in regeneration of conventional cracking catalysts, deactivation is the result of formation of excess coke on the surface of the catalyst. The usual method of removal is to burn this carbonaceous material in the presence of an oxygen-containing gas until substantial activity has been restored. Again, this method will not regenerate the heretofore irreversible deactivation that the above-described crystalline aluminosilicate catalysts undergo.

SUMMARY OF THE INVENTION

A method is provided by which the activity of a crystalline aluminosilicate zeolite catalyst is restored without removing a hydrogenation metal component of the catalyst, if one is present, or damaging the structural framework of the zeolite.

In brief, this invention contemplates soaking a deactivated crystalline aluminosilicate catalyst having pore sizes ranging from about 5 to about 13 angstrom units and a silica to alumina mole ratio greater than 6 with a source of hydrogen ions or a hydrogen ion precursor of such strength or concentration which does not adversely affect the crystalline aluminosilicate structure or if a metal hydrogenation component is present, does not remove the metal. When a mineral acid is the soaking agent, the temperature of the process should not exceed 150° F. and is preferably less than 100° F. When ammonium salts are employed, the maximum temperature is 212° F. with room temperature, i.e. 60° F.–90° F., a preferred embodiment. The soaking treatment is generally for a time of not less than 1 and not more than 48 hours. Soaking for more than 48 hours is not detrimental, but no substantial improvement is derived from such prolonged soaking. Preferably the soaking time is not less than 2 and not more than 10 hours. The process can be done either in "batch" tanks or the soaking solution can be flowed continuously over the catalyst. The catalyst, after the soaking treatment, is washed with water, air dried and calcined at a temperature between 500 and 1100° F. for a time of not less than 1 or more than 18 hours. The calcination can be done in an atmosphere of flowing air or an inert atmosphere of nitrogen, hydrogen, helium, flue gas or other inert gases.

DESCRIPTION OF SPECIFIC EMBODIMENTS

This invention is based upon the finding that over a period of time of prolonged use a slow but irreversible loss of activity occurs in catalysts that have a pore size between 5 and 13 angstrom units and have a silica to alumina mole ratio of greater than 6.0. This loss in activity is more rapid during the period of initial use and then begins to level off after further use of the catalyst. In addition, the failure of oxidative regeneration, which removes excess coke, to restore activity to the aforesaid type of catalyst indicates that coke formation is not the principal cause of the decline in activity.

Illustrative of particular zeolites that can be regenerated by this method are mordenite, erionite, offretite, zeolite ZSM–5, described in Belgium Pat. No. 713,576, zeolite ZSM–4, described in French Pat. No. 1,502,289, zeolite L, described in U.S. 3,006,863, and zeolite beta, described in U.S. 3,308,069. These zeolites generally have a $SiO_2/Al_2O_3$ mole ratio of greater than 6 and can have a ratio up to 120.

In one preferred embodiment of this invention, nickel hydrogen erionite can be reactivated by the soaking process previously described. This particular catalyst is characterized by a pore size of about 5 angstrom units, a silica to alumina ratio between 6 and 8, an exterior that is substantially free of hydrogenation/dehydrogenation activity and the nickel cations contained within the interior thereof are present in amounts of no more than 1.0 nickel cation in a supercage.

Nickel hydrogen erionite was prepared in the following manner. Naturally occurring erionite with the following composition was used as the starting material:

| Compound: | Weight percent |
| --- | --- |
| $SiO_2$ | 69.9 |
| $Al_2O_3$ | 15.8 |
| $Fe_2O_3$ | 3.0 |
| $K_2O$ | 4.4 |
| $CaO$ | 3.6 |
| $Na_2O$ | 2.0 |
| $MgO$ | 1.1 |

The silica to alumina mole ratio was 7.5. The erionite particles were ground to a 0.024 inch average particle size.

Eleven thousand pounds of 5 molar ammonium chloride solution were charged to a kettle and 2,100 pounds of erionite ore were added. This mixture was stirred and heated to 180° F. as rapidly as possible. This temperature was then maintained for 4 hours. The resulting slurry was then cooled and filtered. The filter cake was retreated with an ammonium chloride solution in the manner previously described. The resulting slurry was cooled, filtered and washed with water to yield an ammonium exchanged erionite wet cake. Fifty-five hundred pounds of water were added to this wet cake to make a 25% ammonium exchanged erionite slurry. The slurry was heated up to 190–195° F. This heated slurry was added to a 4,800 pound nickel solution of which 830 pounds were $$Ni(C_2H_3O_2)_2 \cdot 4H_2O$$

The nickel solution had been pre-heated to 190–195 F. The resulting mixture was heated to 210° F. and this temperature was maintained for 2 hours. The heated slurry was filtered, washed and the wet cake was dried at 200–250° F. The dried catalyst was pelleted with the addition of a pelleting aid and calcined at 975° F. for 1 hour to form the nickel hydrogen erionite catalyst.

Nickel hydrogen erionite finds extensive utility in a wide variety of hydrocarbon conversion processes including hydroisomerization, hydrodealkylation, hydrodisproportionation, hydrocarbon oxidation, dehydrogenation, desulfurization, hydrogenation, hydrocracking, polymerization and the like.

Another preferred embodiment of this invention is the reactivation of zeolite T which has been deactivated by calcination treatment.

The acid utilized in this invention includes any mineral acid such as HCl, $H_2SO_4$, $H_3PO_4$, $HNO_3$ and the like. Organic acids may also find utility in the parctice of this invention. Representative of organic acids that may be used are acetic acid, ethylenediamine tetra-acetic acid, chloroacetic acid, oxalic acid, malonic acid, succinic acid, phthalic acid and the like. The concentration of the acid may vary from 0.02 N to 1.0 N and the preferred range is 0.05 to 0.2 N. The ammonium ion concentration may vary from 0.02 to 5 N with the preferred range being 0.1 N to 0.5 N. This process has the advantage of being equally effective with the coke burned off before or after soaking the catalyst.

The following examples will illustrate the advantages of this novel regeneration process.

EXAMPLE 1

The pH's of fresh, aged and regenerated nickel hydrogen erionite were measured. The fresh catalyst was prepared according to the procedure previously described in this specification. The aged catalyst was removed after being contacted with a naphtha stream, which had the portion of material lighter than $C_6$ removed, at 500 p.s.i.g., an $H_2$/HC ratio of about 10:1 and a series of inlet temperature severities from 900° F. to 940° F. The catalyst was removed after 93 days of use.

The regenerated catalyst was prepared in the following manner. A sample of the above described aged catalyst was calcined at 800° F. for 16 hours in a muffle furnace to burn off the coke, reduced in hydrogen at 950° F., 1 atmosphere for 30 minutes; and at 950° F., 200 p.s.i. for 30 minutes, then recalcined at 800° F. in air overnight. The pH of each catalyst was measured by equilibrating each sample with 50 ml. of 0.5 N NaCl solution per gram at room temperature for 16 hours. Table 1 summarizes the results.

TABLE 1

| | pH |
| --- | --- |
| Fresh nickel hydrogen erionite catalyst | 2.4 |
| Aged (93 days) erionite catalyst | 4.5 |
| Combustion regenerated erionite catalyst | 3.0 |

These results indicate that the loss of activity is related to the loss in acidity of the catalyst. In addition, the results show that burning the coke off the aged catalyst does not completely restore the catalyst to its original pH.

EXAMPLE 2

The catalysts in Example 1 were subjected to an activity test which consisted of the following: 0.5 cc. of each catalyst was calcined at 950° F. for 16 hours in a muffle furnace, reduced in hydrogen (80 cc. STP/min.) at 950° F. and 1 atmosphere for 30 minutes. This was followed by a hydrogen reduction (80 cc. STP/min.) at 950° F. and 200 p.s.i. for 30 minutes. A 1:1:2 weight blend of n-hexane/2,3 dimethyl butane/benzene was charged through the reactor at 2 cc./hour together with 80 cc. STP/min. of hydrogen at 800° F. for at least 48 hours. A sample of the reactor effluent was then analyzed by gas chromatography. The activity of the catalyst is indicated by the weight percent conversion of n-hexane. The results are summarized in Table 2.

TABLE 2

| Catalyst: | n-Hexane conversion weight percent |
| --- | --- |
| (1) Fresh nickel hydrogen erionite catalyst | 75.3–80.2 |
| (2) Aged (93 days) | 47.0 |
| (3) Combustion regenerated | 48.0 |

These results indicate that the aged catalyst is considerably less active than the fresh catalyst. This decrease in activity coincides with the increase in the pH of the aged catalyst in Table 1. In addition, these catalytic results indicate that by simply burning off the coke from the aged catalyst, the activity will not be restored even though the regenerated catalyst has a lower pH than the aged catalyst as indicated in Table 1.

EXAMPLE 3

A 0.8 gram sample of the aged catalyst described in Example 1 was calcined at 800° F. for 16 hours in a muffle furnace, then allowed to cool to room temperature. The sample was reactivated by contacting the catalyst with 24 cc. of 0.1 N HCl solution for 24 hours at room temperature, then filtering, washing with water and air drying at 200–250° F. This reactivated catalyst was subjected for 51 hours to the same activity tested as described in Example 2. The n-hexane conversion was 83.6%, indicating that the activity of the aged catalyst was completely returned to a fresh state by virtue of the regeneration process.

EXAMPLE 4

One gram of the calcined aged catalyst described in Example 3 was placed in 100 cc. of 0.1 N $NH_4Cl$ solution and soaked for 4 hours at room temperature, then filtered, washed with water and air dried at 200–250° F. The reactivated catalyst was subjected for 48.5 hours to the same activity test as described in Example 2. The n- hexane conversion was 80.7, indicating that the catalyst had been returned to its fresh state in terms of activity.

EXAMPLE 5

A $C_5^+$ reformate (R+3)O.N.98.6 was contacted with a fresh sample of nickel hydrogen erionite and a reactivated catalyst as described in Example 3 at 400 p.s.i.g., a 2:1 total gas/HC recycle ratio and an inlet temperature of 800° F. The $C_5^+$ and $C_6^+$ volume yield at a target O.N. of 102 $C_6^+$(R+3) were determined for both the fresh and reactivated catalyst. No substantial change in $C_5^+$ and $C_6^+$ volume yield was observed, indicating that the reactivated catalyst was at least as selective as the fresh catalyst.

EXAMPLE 6

The cracking activity of fresh, deactivated and reactivated hydrogen zeolite T was measured. Zeolite T was prepared according to Example 1 of U.S. 2,590,952. One hundred grams of zeolite T was then added to 1400 ml. of 5 N $NH_4Cl$ solution. The solution was heated to 200° F., stirred for 16 hours and then filtered. The filter cake was then added to another 1400 ml. of 5 N $NH_4Cl$. The mixture was stirred for 4 hours at 200° F. and filtered. The filter cake was washed with 2000 ml. of deionized water at room temperature and then washed with boiling deionized water until chloride free. A portion of the filter cake was air dried at 210° F., pelleted and screened to 20/40 mesh. Two grams of this material was calcined in a muffle furnace at 950° F. for 16 hours to produce hydrogen zeolite T. An additional two grams of the pelleted and sized material was deliberately deactivated by increasing the calcination temperature to 1140° F. for 16 hours. One gram of this deactivated hydrogen zeolite T was added to 30 ml. of 0.1 N HCl. The mixture was gently stirred at room temperature for 16 hours and filtered. The catalyst was then washed with water, air dried and pelleted and screened to 20/40 mesh. The sample was then calcined in a muffle furnace at 950° F. for 16 hours.

The three samples were then subjected to the same activity test as described in Example 2, except that the temperature was lowered to 700° F., and the reactor effluent was analyzed after 15 minutes. The results are summarized in Table 3.

TABLE 3

| Catalyst: | n-Hexane conversion weight percent |
|---|---|
| Zeolite T calcined at 950° F. | 95.1 |
| Zeolite T calcined at 1140° F. | 23.0 |
| Reactivated zeolite | 85.7 |

These results indicate that the activity of an ammonium zeolite T is substantially recovered by acid regeneration.

What is claimed is:

1. A method for reactivating a catalyst deactivated in a hydrocarbon conversion process comprising a crystalline aluminosilicate zeolite which has a pore size between about 5 and 13 angstroms and a silica to alumina mole ratio of greater than 6 in combination with nickel a hydrogenation metal component without damaging the structural framework thereof and without removing said nickel hydrogenation metal component from the catalyst which comprises burning carbonaceous material from the surface thereof in the presence of an oxygen-containing gas, contacting said catalyst with a 0.1 N to 0.5 N solution of ammonium chloride at a temperature in the approximate range of 60-90° F. for a period of at least about 1 hour, washing the catalyst with water, air drying and calcining the catalyst at a temperature of not more than 1100° F. for a time of not less than 1 hour.

2. A method according to claim 1 wherein the crystalline aluminosilicate is nickel hydrogen erionite.

References Cited

UNITED STATES PATENTS

| 3,493,490 | 2/1970 | Plank et al. | 252—412 |
| 3,533,959 | 10/1070 | Miale | 252—414 |
| 3,442,794 | 5/1969 | Van Helden et al. | 208—111 |
| 3,442,795 | 5/1969 | Kerr et al. | 208—120 |
| 3,367,884 | 2/1968 | Reid, Jr. | 252—455 Z |
| 3,551,353 | 12/1970 | Chen et al. | 252—455 Z |

PATRICK P. GARVIN, Primary Examiner

P. E. KONOPKA, Assistant Examiner

U.S. Cl. X.R.

208—111, 120; 252—411, 413, 415, 416; 260—683.65